US012581493B2

(12) United States Patent
Prasad et al.

(10) Patent No.: US 12,581,493 B2
(45) Date of Patent: Mar. 17, 2026

(54) DOWNLINK SIZE ESTIMATION FOR MULTICAST TRAFFIC

(71) Applicant: Nokia Technologies Oy, Espoo (FI)

(72) Inventors: Athul Prasad, Naperville, IL (US); David Bhatoolaul, Swindon (GB); Naizheng Zheng, Beijing (CN); David Navratil, Helsinki (FI); Volker Pauli, Ansbach (DE); Ugur Baran Elmali, Munich (DE); Matthew Baker, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 460 days.

(21) Appl. No.: 17/820,019

(22) Filed: Aug. 16, 2022

(65) Prior Publication Data

US 2023/0060839 A1       Mar. 2, 2023

(30) Foreign Application Priority Data

Aug. 18, 2021    (WO) ................ PCT/CN2021/113361

(51) Int. Cl.
*H04W 72/23*          (2023.01)
*H04L 5/00*           (2006.01)
*H04W 72/566*         (2023.01)

(52) U.S. Cl.
CPC ........... *H04W 72/23* (2023.01); *H04L 5/0044* (2013.01); *H04W 72/569* (2023.01)

(58) Field of Classification Search
CPC ... H04W 72/23; H04W 72/569; H04W 72/30; H04W 4/06; H04L 5/0044; H04L 12/1877; H04L 12/189
See application file for complete search history.

(56) References Cited

U.S. PATENT DOCUMENTS

| | | | |
|---|---|---|---|
| 10,257,815 | B2 | 4/2019 | Shan et al. |
| 10,893,506 | B2 | 1/2021 | Islam et al. |
| 2018/0139730 | A1 | 5/2018 | Wang et al. |
| 2019/0182860 | A1 | 6/2019 | Lyu et al. |

(Continued)

FOREIGN PATENT DOCUMENTS

| | | |
|---|---|---|
| CN | 101682400 A | 3/2010 |
| CN | 112119606 A | 12/2020 |

(Continued)

OTHER PUBLICATIONS

Extended European Search Report received for corresponding European Patent Application No. 22190509.4, dated Dec. 15, 2022, 11 pages.

(Continued)

*Primary Examiner* — Hashim S Bhatti
(74) *Attorney, Agent, or Firm* — Brake Hughes Bellermann LLP

(57) ABSTRACT

Embodiments of the present disclosure relates to estimating downlink size for a multicast traffic. According to embodiments of the present disclosure, a first device receives downlink control information (DCI) for a multicast traffic. The first device determines field size(s) in the DCI based on one or more parameters which are associated with the field size estimation for the multicast traffic. The first device decodes the DCI based on the determined field sizes(s). In this way, the DCI can be blindly decoded correctly.

12 Claims, 7 Drawing Sheets

(56) References Cited

U.S. PATENT DOCUMENTS

| | | | |
|---|---|---|---|
| 2019/0387501 A1 | 12/2019 | Park et al. | |
| 2020/0112941 A1* | 4/2020 | Yerramalli | H04W 72/30 |
| 2020/0396760 A1* | 12/2020 | Yi | H04L 1/1812 |
| 2021/0250918 A1 | 8/2021 | Liu et al. | |
| 2022/0303892 A1* | 9/2022 | Awadin | H04W 72/23 |
| 2023/0060839 A1 | 3/2023 | Prasad et al. | |
| 2024/0171251 A1* | 5/2024 | Lee | H04W 72/23 |

FOREIGN PATENT DOCUMENTS

| | | | |
|---|---|---|---|
| EP | 4138471 A1 | 2/2023 | |
| WO | 2020/085991 A1 | 4/2020 | |
| WO | 2021/029440 A1 | 2/2021 | |
| WO | 2021/089797 A1 | 5/2021 | |
| WO | 2023019488 A1 | 2/2023 | |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

"3rd Generation Partnership Project; Technical Specification Group Radio Access Network; NR; Physical layer procedures for control (Release 16)", 3GPP TS 38.213, V16.6.0, Jun. 2021, pp. 1-187.

"WID revision: NR Multicast and Broadcast Services", 3GPP TSG RAN Meeting #88-e, RP-201038, Agenda: 9.10.8, Huawei, Jun. 29-Jul. 3, 2020, 6 pages.

Alepuz et al., "LTE-Advanced Pro Broadcast Radio Access Network Benchmark", Broadcast and Multicast Communication Enablers for the Fifth-Generation of Wireless Systems, 5G-X Cast, Deliverable D3.1, Version v1.1, Jun. 29, 2018, 140 pages.

"Summary#1 on mechanisms to support group scheduling for RRC_Connected UEs for NR MBS", 3GPP TSG RAN WG1 #105-e, R1-2105973, Agenda: 8.12.1, Moderator (CMCC), May 10-27, 2021, pp. 1-71.

"IEEE 802.11", Wikipedia, Retrieved on Aug. 25, 2022, Webpage available at : https://en.wikipedia.org/wiki/IEEE_802.11.

International Search Report and Written Opinion received for corresponding Patent Cooperation Treaty Application No. PCT/CN2021/113361, dated Mar. 28, 2022, 9 pages.

"Group Scheduling Mechanisms to Support 5G Multicast / Broadcast Services for RRC_Connected Ues", 3GPP TSG RAN WG1 Meeting #105-e, R1-2104550, Agenda: 8.12.1, Nokia, May 19-27, 2021, 17 pages.

Office action received for corresponding Chinese Patent Application No. 202210983033.7, dated Jun. 6, 2024, 8 pages of office action and 5 pages of translation available.

Office Action for Chinese Patent Application No. 202210983033.7, mailed on Feb. 27, 2025, 10 pages.

Office Action for Japanese Patent Application No. 2024-509408, mailed on Feb. 25, 2025, 8 pages.

3GPP TS 38.212 V16.6.0; 3rd Generation Partnership Project; Technical Specification Group Radio Access Network; NR; Multiplexing and channel coding (Release 16); Jun. 2021; 153 pages.

Office Action for Canadian Patent Application No. 3,224,597, mailed on Jan. 28, 2025, 3 pages.

Office action received for corresponding Chinese Patent Application No. 202210983033.7, dated Oct. 31, 2024, 6 pages of office action and 5 pages of translation available.

Office Action for Canadian Patent Application No. 3,224,597, mailed on Nov. 14, 2025, 4 pages.

* cited by examiner

100

120

110-1

110-2

110-N

. . . .

200

110-1                                                    120

FIRST                                                  SECOND
DEVICE                                                 DEVICE

TRANSMIT A FIRST RRC CONFIGURATION
← — — — — — — — ·2010— — — — — — — — —

TRANSMIT A SECOND RRC CONFIGURATION
← — — — — — — ·2020— — — — — — — — —

TRANSMIT DOWNLINK CONTROL INFORMATION
←——————————2030——————————

2040    DETERMINE A FIELD SIZE

2050    DECODE THE DOWNLINK CONTROL
        INFORMATION

300

310

RECEIVE DCI FOR A MULTICAST TRAFFIC

320

DETERMINE ONE OR MORE FIELD SIZES IN THE DCI
BASED ON A SET OF PARAMETERS

330

DECODE THE DCI ON THE DETERMINED ONE OR
MORE FIELD SIZES

1

DOWNLINK SIZE ESTIMATION FOR MULTICAST TRAFFIC

FIELD

Embodiments of the present disclosure generally relate to the field of telecommunication and in particular, to methods, devices, apparatuses and computer readable storage medium for estimating downlink size for a multicast traffic.

BACKGROUND

With development of communication technologies, several solutions have been proposed to provide efficient and reliable solutions for communication. For example, Multicast and Broadcast Service (MBS) has been proposed to make it possible for efficient use of radio and network resources while transmitting audio and video content to a large group of end users. MB S used herein refers to a point-to-multipoint communication scheme where data packets are transmitted simultaneously from a single source to multiple destinations. The term "broadcast" refers to the ability to deliver content to all users. The term "multicast" refers to distribution of content among a specific group of users that are subscribed to those services.

SUMMARY

In general, example embodiments of the present disclosure provide a solution for estimating downlink size for a multicast traffic.

In a first aspect, there is provided a first device. The first device comprises at least one processor; and at least one memory including computer program codes; the at least one memory and the computer program codes are configured to, with the at least one processor, cause the first device to: receive, from a second device, downlink control information for a multicast traffic; determine, at the first device, one or more field sizes in the downlink control information based on a set of parameters associated with a field size estimation for the multicast traffic; and decode the downlink control information based on the determined one or more field sizes.

In a second aspect, there is provided a second device. The second device comprises at least one processor; and at least one memory including computer program codes; the at least one memory and the computer program codes are configured to, with the at least one processor, cause the second device to: transmit, to a first device, a radio resource control configuration for a multicast traffic, the second radio resource control configuration comprising a set of parameters associated with an field size estimation for the multicast traffic; and transmit, to the first device, downlink control information for the multicast traffic.

In a third aspect, there is provided a method. The method comprises receiving, at a first device and from a second device, downlink control information for a multicast traffic; determining, at the first device, one or more field sizes in the downlink control information based on a set of parameters associated with a field size estimation for the multicast traffic; and decoding the downlink control information based on the determined one or more field sizes.

In a fourth aspect, there is provided a method. The method comprises transmitting, at a second device and to a first device, a radio resource control configuration for a multicast traffic, the second radio resource control configuration comprising a set of parameters associated with an field size estimation for the multicast traffic; and transmitting, to the first device, downlink control information for the multicast traffic.

In a fifth aspect, there is provided an apparatus. The apparatus comprise means for receiving, at a first device and from a second device, downlink control information for a multicast traffic; means for determining, at the first device, one or more field sizes in the downlink control information based on a set of parameters associated with a field size estimation for the multicast traffic; and means for decoding the downlink control information based on the determined one or more field sizes.

In a sixth aspect, there is provided an apparatus. The apparatus comprises means for transmitting, at a second device and to a first device, a radio resource control configuration for a multicast traffic, the second radio resource control configuration comprising a set of parameters associated with a field size estimation for the multicast traffic; and means for transmitting, to the first device, downlink control information for the multicast traffic.

In a seventh aspect, there is provided a computer readable medium. The computer readable medium comprises program instructions for causing an apparatus to perform at least the method according to any one of the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
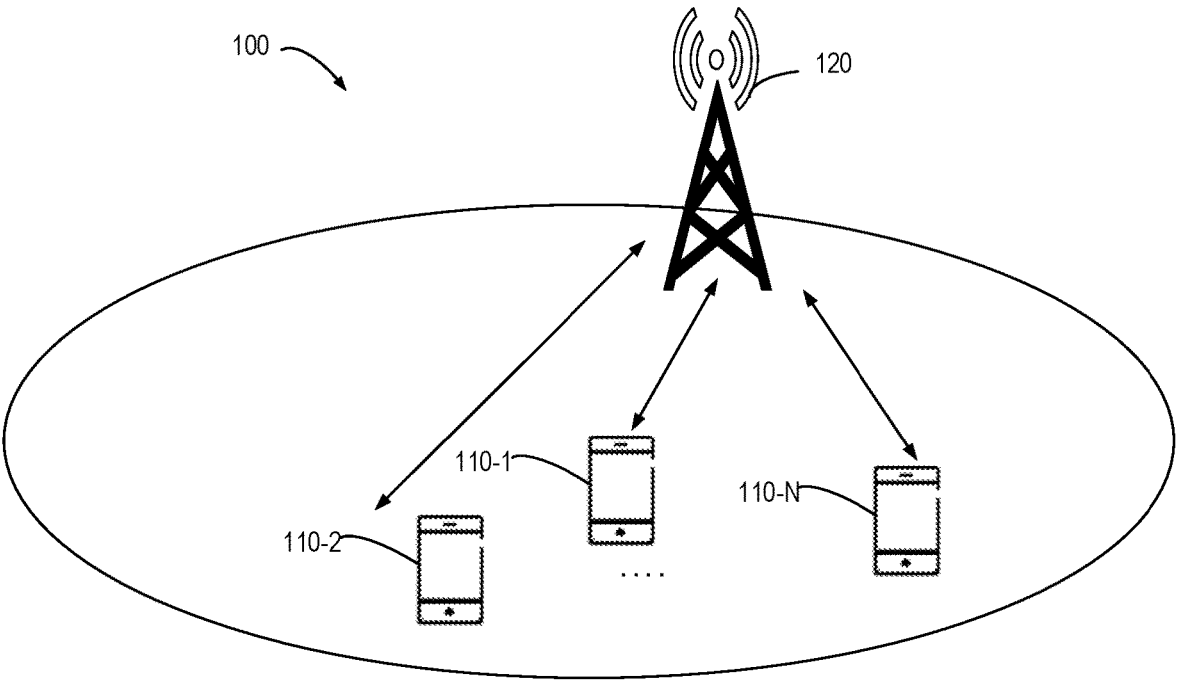
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), New Radio-Advanced (NR-A), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

As mentioned above, the MBS has been proposed. The UE should register the MBS service. The term "MBS radio bearer (MRB)" used herein can be defined as for transporting multicast and broadcast traffic in a point to point (PTP) or point to multipoint (PTM) mode. Multiple multimedia broadcast multicast service (MBMS) control channel (MCCH) may be supported. Multiple-MCCH case may also be discussed considering that 5G network is demanded to supply more diverse service types with different latency requirements.

As part of the work item on 5G/NR multicast, 3GPP is currently defining mechanisms for enabling the delivery of multicast/broadcast traffic to a multitude of UEs. One of the key aims of is to define group scheduling mechanisms that enable the multicast/broadcast traffic to be scheduled using the common data channel resources—while maintaining maximum commonalities with the currently defined unicast scheduling and operation mechanisms. One of the objectives is the support for idle and inactive mode UEs.

Moreover, the broadcast should be supported for all RRC states. In 4G systems, the group scheduling mechanisms can be enabled using semi-static or dynamic broadcast signaling of control information which pointed to semi-static or dynamic shared data channel resources—for evolved multicast broadcast multimedia service (eMBMS) and single-cell point-to-multipoint (SC-PTM). For eMBMS and SC-PTM, due to the support for receive-only mode UEs, there were lot of limitations imposed on the system design, such as the support for devices that are not registered with the network, support for idle mode devices, etc., which had significant impact in terms of how the multicast data/traffic channel (MTCH) and multicast control channel (MCCH) information was sent using the physical channel—using physical downlink shared channel (PDSCH) or physical multicast channel (PMCH). It is important to note that various physical layer scheduling concepts such as bandwidth parts did not exist for LTE, as well as logical channels such as SCMCCH/MTCH are not defined for 5G/NR, which makes it impossible to redefine LTE based multicast-broadcast features for 5G. PDCCH scheduling in 5G/NR is also significantly different from LTE, which makes it challenging to adapt parameters defined for LTE to be used in 5G.

Downlink control information (DCI) formats 1_0, 1_1 and 1_2 are used by the gNB to inform a UE about the PDSCH resources where downlink data would be scheduled. Currently these formats have been defined for unicast traffic, which implies that the gNB would utilize any of these DCI formats to inform a UE about the PDSCH resource using UE-specific PDCCH. Up to now, it has been agreed that DCI formats 1_0 and 1_1 could be used as baseline for scheduling multicast traffic PDSCH resources. Table 1 below shows some variable size fields in DCI format 1_1.

TABLE 1

| DCI Field | Size in Bits |
| --- | --- |
| Carrier indicator | 0, 3 |
| Bandwidth part indicator | 0, 1, 2 |
| Frequency domain resource assignment | Variable |
| VRB-to-PRB mapping | 0, 1 |
| PRB bundling size indicator | 0, 1 |
| Rate matching indicator | 0, 1, 2 |
| ZP CSI-RS Trigger | 0, 1, 2 |
| Downlink assignment index | 0, 2, 4 |
| PDSCH-to-HARQ_feedback timing indicator | 0, 1, 2, 3 |
| Antenna port(s) and number of layers | 4, 5, 6 |
| Transmission configuration indication | 0, 3 |
| CBG transmission information(CBGTI) | 0, 2, 4, 6, 8 |
| CBG flushing out information(CBGFI) | 0, 1 |
| Downlink assignment index | 0, 2, 4 |
| PDSCH-to-HARQ_feedback timing indicator | 0, 1, 2, 3 |

The total number of different DCI sizes configured to monitor is up to four for a cell and the total number of different DCI sizes with C-RNTI configured to monitor is up to three for a cell. Out of these three DCI sizes, one size is for scheduling downlink assignments for non-fallback format (DCI format 1_1), one size for fallback DCI formats (DCI formats 0_0 and 1_0) and the third size for uplink scheduling non-fallback format (DCI format 0_1). DCI format 0_0 is used for uplink resource allocation (scheduling grants) for PUSCH. As explained before, this is a fallback DCI format. DCI format 0_1 is used for uplink resource allocation (scheduling grants) for PUSCH. As explained before, this is a non-fallback DCI format. It's CRC can be scrambled by C-RNTI or CS-RNTI or MCS-C-RNTI or SP-CSI-RNTI. DCI format 1_0 is used for allocating downlink resources for PDSCH. As explained before, this is a fallback DCI format. The presence and the value of a specific field within DCI format 1_0 depends upon the type of the RNTI with which DCI format 1_0 is being scrambled with. DCI format 1_1 is used for allocating downlink resources for PDSCH. As explained before, this is a non-fallback DCI format. Unlike DCI format 1_0, this DCI format can only be addressed to C-RNTI, CS-RNTI or MCS-C-RNTI. The gNB may preempt an ongoing PDSCH transmission to one UE with a latency-critical transmission to another UE. The gNB can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE. DCI format 2_1 is used for notifying the PRB(s) and OFDM symbol(s) where UE may assume no transmission is intended for the UE. DCI format 2_2 is used for the transmission of TPC commands for PUCCH and PUSCH. DCI format 2_3 is used for the transmission of a group of TPC commands for SRS transmissions by one or more UEs. Along with a TPC command, an SRS request may also be transmitted within DCI.

If higher layer configuration parameters are not aligned for multicast traffic, it may lead to different UEs receiving the same multicast DCI to assume different DCI sizes. This would lead to failed blind decoding attempts. Moreover, it has been agreed to keep the existing limits for DCI size budget for blind decoding—which implies that there could be either a maximum of three different sizes that the gNB could use for a DCI with CRC scrambled using the group radio network temporary identifier (G-RNTI) if it is counted as cell RNTI (C-RNTI) or one size if it is counted as other-RNTI. This imposes significant limitations on the DCI size that could be allocated for G-RNTI based DCI.

As described earlier, due to possible lack of alignment of higher layer configuration, different UEs receiving the same MBS service may have different assumptions related to the size of various DCI fields. This might be necessary as well, for e.g., assuming that UEs have different requirements for number of configured BWPs, priority indication, etc. Hence, a mechanism is required to overcome this challenge, so that all UEs receiving the same multicast traffic could align their DCI size estimation.

A new solution on estimating downlink size for a multicast traffic is needed. According to embodiments of the present disclosure, a first device receives DCI for a multicast traffic. The first device determines field size(s) in the DCI based on one or more parameters which are associated with the field size estimation for the multicast traffic. The first device decodes the DCI based on the determined field sizes(s). In this way, the DCI can be blindly decoded correctly.

FIG. 1 illustrates a schematic diagram of a communication environment 100 in which embodiments of the present disclosure can be implemented. The communication environment 100, which is a part of a communication network, further comprises a device 110-1, a device 110-2, . . . . . , a device 110-N, which can be collectively referred to as "first device(s) 110." The communication environment 100 comprises a second device 120. The number N can be any suitable integer numbers.

The communication environment 100 may comprise any suitable number of devices and cells. In the communication environment 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). The first device 110 can be configured with more than one cell.

It is to be understood that the number of first devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
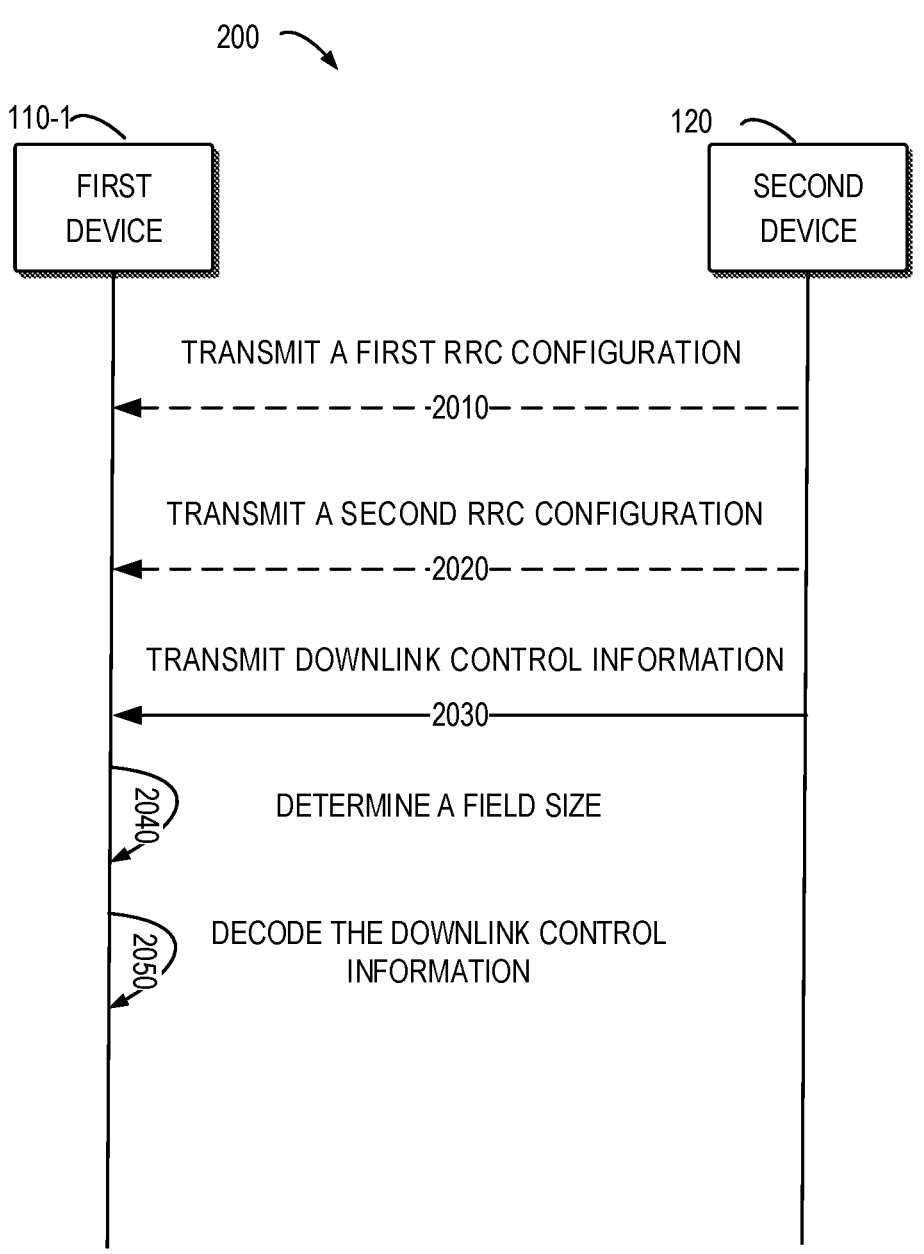
FIG. 2 illustrates a signaling flow for delivering beam information according to some example embodiments of the present disclosure.

Example embodiments of the present disclosure will be described in detail below with reference to the accompanying drawings. Reference is now made to FIG. 2, which illustrates a signaling flow 200 for determining field sized in the DCI according to example embodiments of the present disclosure. For the purpose of discussion, the signaling flow 200 will be described with reference to FIG. 1. Only for the purpose of illustrations, the signaling flow 200 may involve the first device 110-1 and the second device 120.

In some example embodiments, the second device 120 may transmit 2010 a first RRC configuration to the first device 110-1. The first RRC configuration may be used for determining DCI field size for unicast traffic(s). For example, DCI formats 1_0, 1_1 and 1_2 can used by the second device 120 to inform the first device 110-1 about the PDSCH resources where downlink data would be scheduled.

The second device 120 may transmit 2020 a second RRC configuration for a multicast traffic to the first device 110-1. The multicast traffic can be any suitable type of multicast traffic—which is received by a group of users or broadcast traffic which could be received by all users connected to the network.

The second RRC configuration can comprise a set of parameters associated with a field size estimation for the multicast traffic. For example, the set of parameters may comprise a carrier indicator field parameter which indicates a size of a carrier indicator field in DCI for the multicast traffic. In other words, the carrier indicator field parameter can inform the first device 110-1 regarding the field size of the carrier indicator to be assumed for the DCI.

Alternatively or in addition, the set of parameters can comprise a bandwidth part indicator field parameter which indicates a size of a bandwidth part indicator field in the downlink control information. This parameter can enable the first device 110-1 to determine the field size to be assumed for the bandwidth part indicator field.

In some example embodiments, the set of parameters can comprise a feedback timing indicator field parameter which indicates a size of a feedback timing indicator field in the downlink control information. For example, the feedback timing indicator may be PDSCH-to-HARQ_feedback timing indicator. When HARQ ACK/NACK or NACK only is enabled, the size of the feedback timing indicator field is the same for terminal devices receiving the multicast traffic as indicated by the feedback timing indicator field parameter. However, terminal devices may need to interpret the feedback timing indicator differently, i.e. the same value of the feedback timing indicator may correspond to different timings. For example, if HARQ ACK/NACK is enabled, the first device 110-1 may need to interpret a signaled value in the PDSCH-to-HARQ_feedback timing indicator field differently from another first device (for example, the device 110-2). In this case, the first device 110-1 needs to receive a configuration instructing the device how to interpret values of PDSCH-to-HARQ_feedback timing indicator in e.g., the first RRC configuration 2010. The first device 110-1 may combine the configuration received using the first RRC configuration with the common configuration received using the second RRC configuration to derive unique HARQ ACK/NACK feedback resources.

In some embodiments, the second device 120 may configure an offset to be applied by the first device 110-1 for G-RNTI scrambled DCI. The first device 110-1 may determine the feedback timing based on the offset. For example, the first device 110-1 would then determine the index I=(PDSCH-to-HARQ_feedback timing indicator+offset) mod $2^{(\text{length of the PDSCH-to-HARQ\_feedback timing indicator field})}$. Alternatively, the second device 120 may configure a table of PUCCH configurations in needed order.

In other example embodiments, the set of parameters may comprise a priority indicator field parameter which indicates a size of a priority indicator field in the downlink control information.

In addition, the set of parameters can comprise a parameter for an optional configuration. The parameter may indicate a size of the optional configuration in the downlink control information. The optional configuration may comprise a virtual resource block (VRB) to physical resource block (PRB) mapping. The optional configuration may also comprise a PRB bundling size indicator. In other embodiments, the optional configuration may comprise a rate matching indicator. Alternatively or in addition, the optional configuration may comprise a zero power channel state information reference signal (ZP CSI-RS) trigger. The optional configuration can also comprise a downlink assignment index. In some example embodiments, the optional configuration may comprise an antenna port and number of layers. In other example embodiments, the optional configuration may comprise a physical downlink shared channel (PDSCH) group index. The optional configuration may comprise a new feedback indicator. Additionally, the optional configuration may comprise a number of requested PDSCH groups. As an example embodiment, the optional configuration may comprise a sounding reference signal request. Code block group (CBG) transmission information may be included in the optional configuration. The optional configuration can also comprise CBG flushing out information (CBGFI). Alternatively or in addition, the optional configuration may comprise a minimum applicable scheduling offset indicator. In some example embodiments, the optional configuration may comprise a secondary cell dormancy indication. The optional configuration can comprise other configuration which is not explicitly required for the multicast traffic.

The set of parameters can comprise any one or any combinations of the above mentioned parameters. The set of parameters may also comprise other parameter(s) which also relates to estimating the field size in the DCI.

In some embodiments, the set of parameters can be signaled as part of PDCCH configuration, for example, pdcch-config-mbs which is based on pdcch-config that provides UE's control resource set parameters and additional parameters required for acquiring the PDCCH, as defined in TS 38.331, and provides the common set of DCI field size parameters that needs to be applied for a DCI with CRC scrambled using G-RNTI. Alternatively, the set of parameters may be signaled as part of PDSCH configuration, for example, pdsch-config-mbs which is based on pdsch-config that contains higher layer parameters that UE utilizes to estimate some of the variable size DCI fields as defined in TS 38.331. The PDCCH configuration/PDSCH configuration may be transmitted as a part of the second RRC configuration. The second RRC configuration may be a group-common RRC message. For example, the second RRC configuration may be signaled using a group-common RNTI. The second RRC configuration may also be a UE-specific RRC message, and the first device 110-1 may apply the second RRC configuration for determining the DCI size only for DCI that is scrambled using a group-common RNTI. In an example embodiment, the second RRC configuration may be transmitted together with the first RRC configuration in a single UE-Specific RRC message.

Alternatively, default values of some or all parameters of the set of parameters may be predetermined or configured at the first device 110-1. The first device 110-1 can apply these default values for estimating the DCI size for blind decoding, if multicast scheduling parameters such as G-RNTI, related search spaces and DCI formats are configured, and if the second device 120 does not transmit some or all parameters of the set of parameters to the first devices. The default values may be specified in standard specification, hardcoded in the first devices, or configured by the second device via certain configuration message, e.g., the first RRC configuration.

The second device 120 transmits 2030 DCI for a multicast to the first device 110-1. For example, a format of the DCI may be DCI format 1_0 or DCI format 1_1. If the format of the DCI is DCI format 1_0, the DCI has only limited variable size fields. In some embodiments, the first device 110-1 may determine the DCI format of said DCI. If the DCI format is not a preconfigured format (only as an example, DCI format 1_0), the first device 110-1 may determine whether a common frequency resource (CFR) is configured. In this case, if the CFR is not configured, the first device 110-1 may determine a frequency domain resource allocation (FDRA) field size based on an active bandwidth part size. Alternatively, if the CFR is configured, the first device 110-1 may determine a FDRA field size based on a CFR size.

The first device 110-1 determines 2040 one or more field sizes in the DCI based on the set of parameters. Only as an example embodiments, the set of parameters may indicate the followings: a carrier indicator field has 3 bits, a bandwidth part indicator field has 1 bit, the VRB-to-PRB mapping field has 1 bit, the PRB bundling size indicator field has 0 bit, a rate matching indicator field has 2 bits, a ZP CSI-RS Trigger field has 2 bits, the downlink assignment index has 4 bits, the PDSCH-to-HARQ_feedback timing indicator field has 0 bit, the antenna port(s) and number of layers field has 4 bits, the transmission configuration indication field has 3 bits, the CBGTI field has 6 bits, the CBGFI field has 1 bits. In this way, the field sizes in the DCI can be determined correctly and avoids failures in decoding the DCI.

In some embodiments, if the first device 110-1 does not receive the second RRC configuration for the multicast traffic from the second device 120, the first device 110-1 may determine whether the set of parameters are predetermined and configured at the first device 110-1. If the set of parameters are predetermined and configured at the first device 110-1, the first device 110-1 may determine the one or more field sizes based on the set of predetermined and configured parameters.

Alternatively, the second RRC configuration for the multicast traffic may comprise a subset of the set of parameters. The rest parameters in the set of parameters may have default values at the first device 110-1. In other words, the rest parameters can be predefined and the second RRC configuration does not need to carry the rest parameters which have default values. In this case, the first device 110-1 may determine the one or more field sizes based on the subset of the parameters and the default values of the rest parameters. In this way, signaling the may be reduced. Only as an example, the second RRC configuration for the multicast traffic may indicate: a carrier indicator field has 3 bits, a bandwidth part indicator field has 1 bit, the VRB-to-PRB mapping field has 1 bit, the PRB bundling size indicator field has 0 bit. The rest parameters are default values, for example, a rate matching indicator field is set to 0 bit, a ZP CSI-RS Trigger field is set to 0 bit, the downlink assignment index is set to 0 bit, the PDSCH-to-HARQ_feedback timing indicator field is set to 0 bit, the antenna port(s) and number of layers field has 4 bits, the transmission configuration indication field is set to 0 bit, the CBGTI field is set to 0 bit, the CBGFI field is set to 0 bit. Thus, the first device 110-1 may determine the field sizes of the carrier indicator field, bandwidth part indicator field, the VRB-to-PRB mapping field and the bandwidth part indicator field based on the first subset of parameters in the second RRC configuration and determine the field sizes of other fields based on the second subset of parameters which have default values. The default values of some or all parameters could be sent over an RRC configuration that is common for all the UEs receiving the multicast or broadcast service. This could be achieved by defining a specific radio network temporary identifier for signaling the default values from the second device to the first devices. The default values of some or all parameters could also be sent individually to each UE, e.g., via the first RRC configuration, with the indication that the parameters are to be applied only for receiving multicast or broadcast traffic, where the CRC of the DCI is scrambled using the G-RNTI.

The first device 110-1 decodes 2050 the DCI based on the determined one or more field sizes. For example, as mentioned above, the first device 110-1 may determine the size of fields in the DCI based on the set of parameters. The first device 110-1 can decode the DCI correctly since it understands the field sizes. The first device 110-1 may apply the set of parameters which are received from the second device 120 or configured at the first device 110-1 for blind decoding, if multicast scheduling parameters, such as, G-RNTI, related search spaces and DCI formats are configured. In this way, it improved efficiency of the blind decoding.

Figure 3:
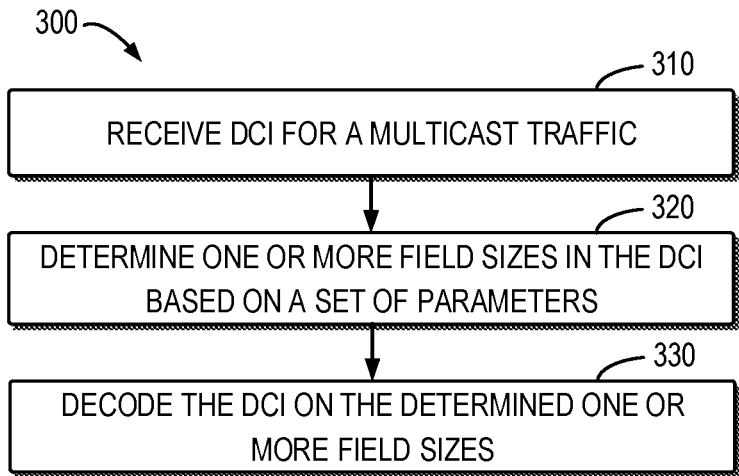
FIG. 3 illustrates a flowchart of a method implemented at a first apparatus according to some example embodiments of the present disclosure.

FIG. 3 shows a flowchart of an example method 300 in accordance with some example embodiments of the present disclosure. For the purpose of discussion, the method 300 will be described from the perspective of the first device.

Only for the purpose of illustrations, the method 300 is described with the reference to the first device 110-1.

In some example embodiments, the first device 110-1 may receive a first RRC configuration from the second device 120. The first RRC configuration may be used for determining DCI field size for unicast traffic(s). For example, DCI formats 1_0, 1_1 and 1_2 can used by the second device 120 to inform the first device 110-1 about the PDSCH resources where downlink data would be scheduled.

Alternatively or in addition, the first device 110-1 may receive a second RRC configuration for a multicast traffic from the second device 120. The multicast traffic can be any suitable type of multicast traffic— which is received by a group of users or broadcast traffic which could be received by all users connected to the network.

The second RRC configuration can comprise a set of parameters associated with field size estimation for the multicast traffic. For example, the set of parameters may comprise a carrier indicator field parameter which indicates a size of a carrier indicator field in DCI for the multicast traffic. In other words, the carrier indicator field parameter can inform the first device 110-1 regarding the field size of the carrier indicator to be assumed for the DCI.

Alternatively or in addition, the set of parameters can comprise a bandwidth part indicator field parameter which indicates a size of a bandwidth part indicator field in the downlink control information. This parameter can enable the first device 110-1 to determine the field size to be assumed for the bandwidth part indicator field.

In some example embodiments, the set of parameters can comprise a feedback timing indicator parameter which indicates a size of a feedback timing indicator field in the downlink control information. For example, the feedback timing indicator may be PDSCH-to-HARQ_feedback timing indicator. When HARQ ACK/NACK or NACK only is enabled, the size of the feedback timing indicator field is the same for terminal devices receiving the multicast traffic as indicated by the feedback timing indicator field parameter. However, terminal devices may need to interpret the feedback timing indicator differently, i.e. the same value of the feedback timing indicator may correspond to different timings. For example, if HARQ ACK/NACK is enabled, the first device 110-1 may need to interpret a signaled value in the PDSCH-to-HARQ_feedback timing indicator field differently from another first device (for example, the device 110-2). In this case, the first device 110-1 needs to receive a configuration instructing the device how to interpret values of PDSCH-to-HARQ_feedback timing indicator in e.g., the first RRC configuration 2010. The first device 110-1 may combine the configuration received using the first RRC configuration with the common configuration received using the second RRC configuration to derive unique HARQ ACK/NACK feedback resources.

In some embodiments, the second device 120 may configure an offset to be applied by the first device 110-1 for G-RNTI scrambled DCI. The first device 110-1 may determine the feedback timing based on the offset. For example, the first device 110-1 would then determine the index I=(PDSCH-to-HARQ_feedback timing indicator+offset) mod 2^(length of the PDSCH-to-HARQ_feedback timing indicator field)). Alternatively, the second device 120 may configure a table of PUCCH configurations in needed order.

In other example embodiments, the set of parameters may comprise a priority indicator field parameter which indicates a size of a priority indicator field in the downlink control information.

In addition, the set of parameters can comprise a parameter for an optional configuration. The parameter may indicate a size of the optional configuration in the downlink control information. The optional configuration may comprise a virtual resource block (VRB) to physical resource block (PRB) mapping. The optional configuration may also comprise a PRB bundling size indicator. In other embodiments, the optional configuration may comprise a rate matching indicator. Alternatively or in addition, the optional configuration may comprise a zero power channel state information reference signal (ZP CSI-RS) trigger. The optional configuration can also comprise a downlink assignment index. In some example embodiments, the optional configuration may comprise an antenna port and number of layers. In other example embodiments, the optional configuration may comprise a physical downlink shared channel (PDSCH) group index. The optional configuration may comprise a new feedback indicator. Additionally, the optional configuration may comprise a number of requested PDSCH groups. As an example embodiment, the optional configuration may comprise a sounding reference signal request. Code block group (CBG) transmission information may be included in the optional configuration. The optional configuration can also comprise CBG flushing out information (CBGFI). Alternatively or in addition, the optional configuration may comprise a minimum applicable scheduling offset indicator. In some example embodiments, the optional configuration may comprise a secondary cell dormancy indication. The optional configuration can comprise other configuration which is not explicitly required for the multicast traffic.

The set of parameters can comprise any one or any combinations of the above mentioned parameters. The set of parameters may also comprise other parameter(s) which also relates to estimating the field size in the DCI.

In some embodiments, the set of parameters can be signaled as part of PDCCH configuration, for example, pdcch-config-mbs which is based on pdcch-config that provides UE's control resource set parameters and additional parameters required for acquiring the PDCCH, as defined in TS 38.331, and provides the common set of DCI field size parameters that needs to be applied for a DCI with CRC scrambled using G-RNTI. Alternatively, the set of parameters may be signaled as part of PDSCH configuration, for example, pdsch-config-mbs which is based on pdsch-config that contains higher layer parameters that UE utilizes to estimate some of the variable size DCI fields as defined in TS 38.331. The PDCCH configuration/PDSCH configuration may be transmitted as a part of the second RRC configuration. The second RRC configuration may be a group-common RRC message. For example, the second RRC configuration may be signaled using a group-common RNTI. The second RRC configuration may also be a UE-specific RRC message, and the first device 110-1 may apply the second RRC configuration for determining the DCI size only for DCI that is scrambled using a group-common RNTI. In an example embodiment, the second RRC configuration may be transmitted together with the first RRC configuration in a single UE-Specific RRC message.

Alternatively, default values of some or all parameters of the set of parameters may be predetermined or configured at the first device 110-1. The first device 110-1 can apply these default values for estimating the DCI size for blind decoding, if multicast scheduling parameters such as G-RNTI, related search spaces and DCI formats are configured, and if the second device 120 does not transmit some or all parameters of the set of parameters to the first devices. The default values may be specified in standard specification, hard-coded in the first devices, or configured by the second device via certain configuration message, e.g., the first RRC configuration.

At block 310, the first device 110-1 receives DCI for a multicast from the second device 120. For example, a format of the DCI may be DCI format 1_0 or DCI format 1_1. If the format of the DCI is DCI format 1_0, the DCI has only limited variable size fields. In some embodiments, the first device 110-1 may determine the DCI format of said DCI. If the DCI format is not a preconfigured format (only as an example, DCI format 1_0), the first device 110-1 may determine whether a common frequency resource (CFR) is configured. In this case, if the CFR is not configured, the first device 110-1 may determine a frequency domain resource allocation (FDRA) field size based on an active bandwidth part size. Alternatively, if the CFR is configured, the first device 110-1 may determine a FDRA field size based on a CFR size.

At block 320, the first device 110-1 determines one or more field sizes in the DCI based on the set of parameters. Only as an example embodiments, the set of parameters may indicate the followings: a carrier indicator field has 3 bits, a bandwidth part indicator field has 1 bit, the VRB-to-PRB mapping field has 1 bit, the PRB bundling size indicator field has 0 bit, a rate matching indicator field has 2 bits, a ZP CSI-RS Trigger field has 2 bits, the downlink assignment index has 4 bits, the PDSCH-to-HARQ_feedback timing indicator field has 0 bit, the antenna port(s) and number of layers field has 4 bits, the transmission configuration indication field has 3 bits, the CBGTI field has 6 bits, the CBGFI field has 1 bits. In this way, the field sizes in the DCI can be determined correctly and avoids failures in decoding the DCI.

In some embodiments, if the first device 110-1 does not receive the second RRC configuration for the multicast traffic from the second device 120, the first device 110-1 may determine whether the set of parameters are predetermined and configured at the first device 110-1. If the set of parameters are predetermined and configured at the first device 110-1, the first device 110-1 may determine the one or more field sizes based on the set of predetermined and configured parameters.

Alternatively, the second RRC configuration for the multicast traffic may comprise a subset of the set of parameters. The rest parameters in the set of parameters may have default values at the first device 110-1. In other words, the rest parameters can be predefined and the second RRC configuration does not need to carry the rest parameters which have default values. In this case, the first device 110-1 may determine the one or more field sizes based on the subset of the parameters and the default values of the rest parameters. In this way, signaling the may be reduced. Only as an example, the second RRC configuration for the multicast traffic may indicate: a carrier indicator field has 3 bits, a bandwidth part indicator field has 1 bit, the VRB-to-PRB mapping field has 1 bit, the PRB bundling size indicator field has 0 bit. The rest parameters are default values, for example, a rate matching indicator field is set to 0 bit, a ZP CSI-RS Trigger field is set to 0 bit, the downlink assignment index is set to 0 bit, the PDSCH-to-HARQ_feedback timing indicator field is set to 0 bit, the antenna port(s) and number of layers field has 4 bits, the transmission configuration indication field is set to 0 bit, the CBGTI field is set to 0 bit, the CBGFI field is set to 0 bit. Thus, the first device 110-1 may determine the field sizes of the carrier indicator field, bandwidth part indicator field, the VRB-to-PRB mapping field and the bandwidth part indicator field based on the first subset of parameters in the second RRC configuration and determine the field sizes of other fields based on the second subset of parameters which have default values. The default values of some or all parameters could be sent over an RRC configuration that is common for all the UEs receiving the multicast or broadcast service. This could be achieved by defining a specific radio network temporary identifier for signaling the default values from the second device to the first devices. The default values of some or all parameters could also be sent individually to each UE, e.g., via the first RRC configuration, with the indication that the parameters are to be applied only for receiving multicast or broadcast traffic, where the CRC of the DCI is scrambled using the G-RNTI.

At block 330, the first device 110-1 decodes the DCI based on the determined one or more field sizes. For example, as mentioned above, the first device 110-1 may determine the size of fields in the DCI based on the set of parameters. The first device 110-1 can decode the DCI correctly since it understands the field sizes. The first device 110-1 may apply the set of parameters which are received from the second device 120 or configured at the first device 110-1 for blind decoding, if multicast scheduling parameters, such as, G-RNTI, related search spaces and DCI formats are configured. In this way, it improved efficiency of the blind decoding.

Figure 4:
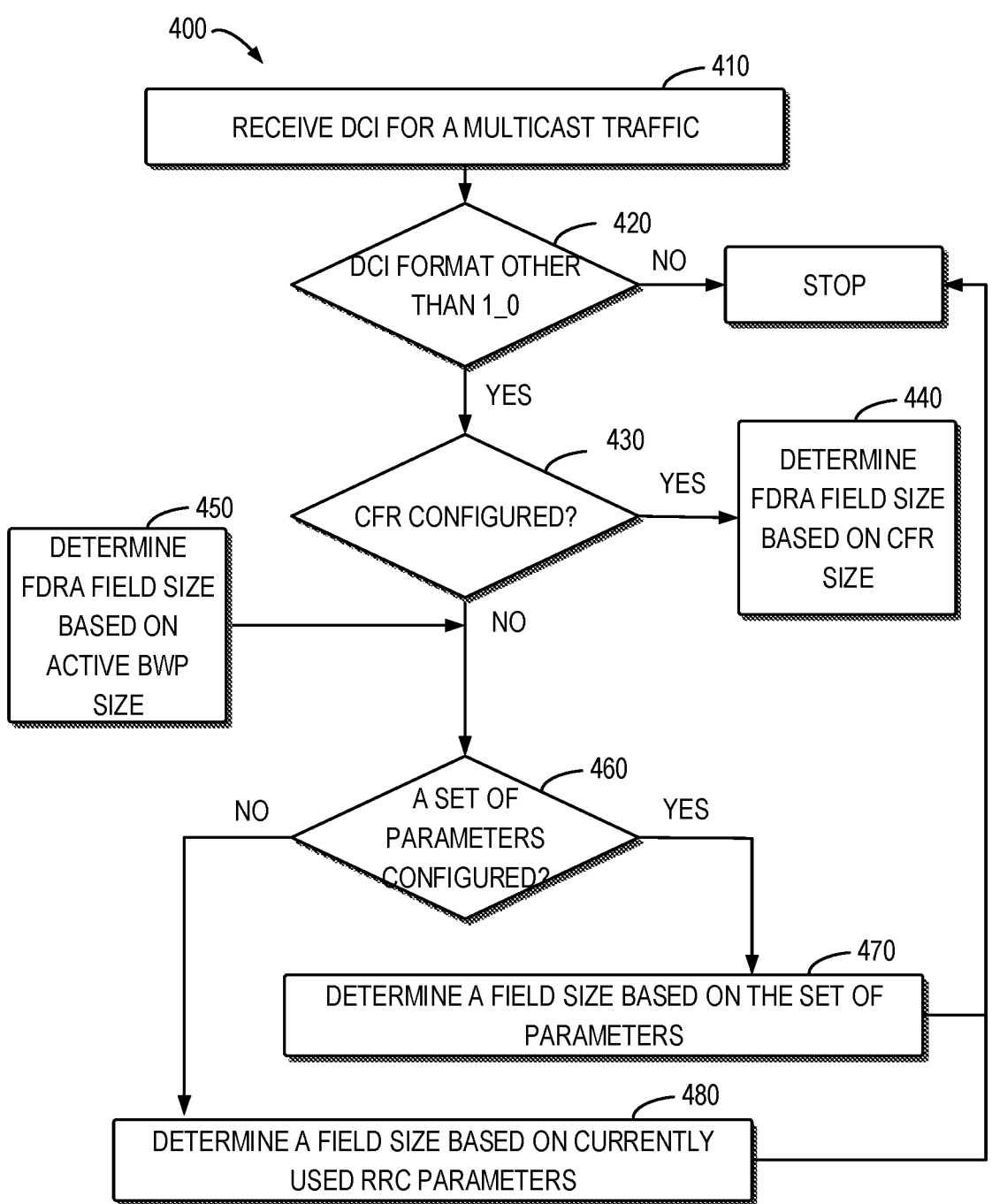
FIG. 4 illustrates a flowchart of a method implemented at a first apparatus according to some other example embodiments of the present disclosure.
Figure 5:
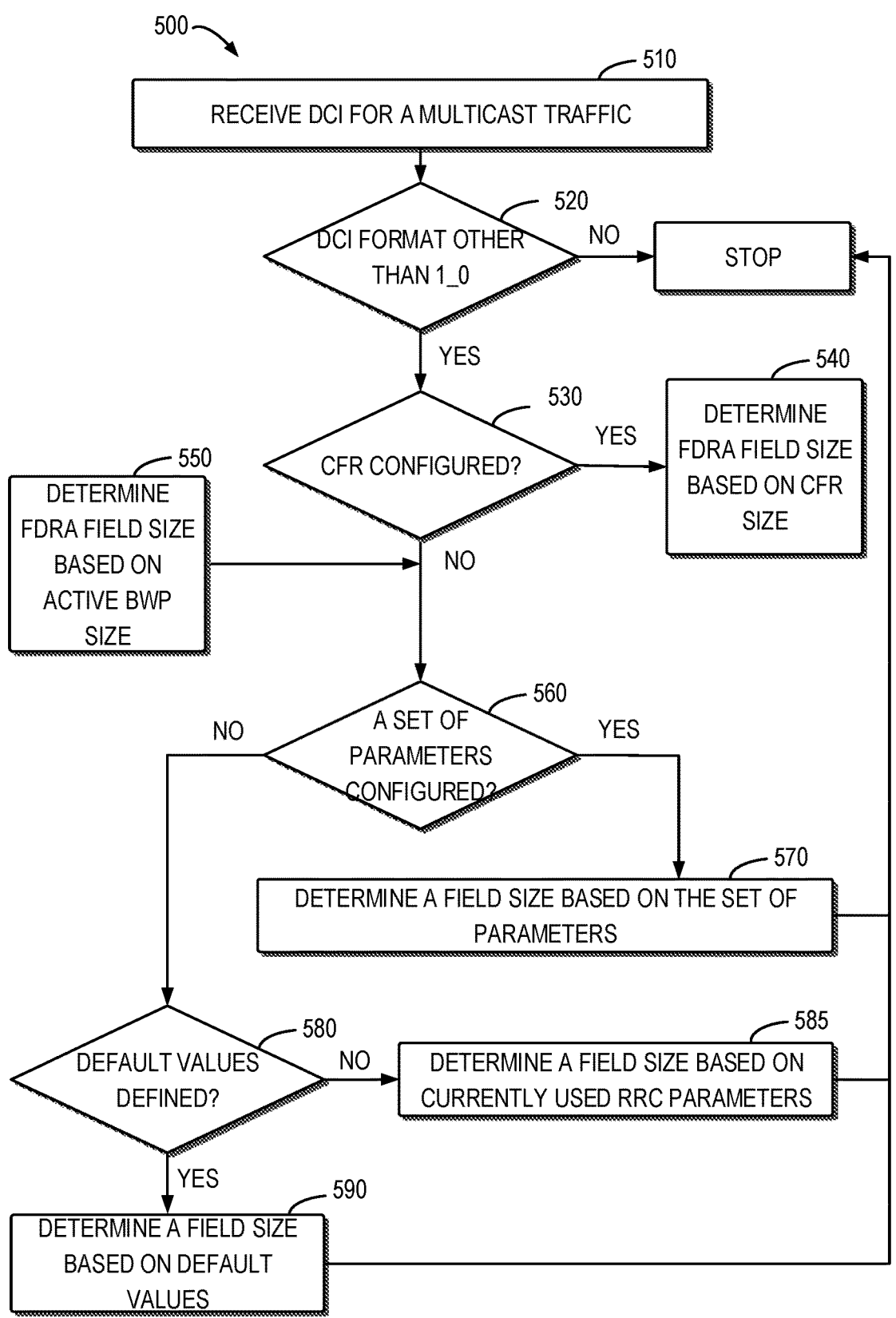
FIG. 5 illustrates a flowchart of a method implemented at a first apparatus according to some other example embodiments of the present disclosure.

Example embodiments for estimating the field sizes in the DCI are described with the reference to FIGS. 4 and 5. FIG. 4 shows a flowchart of an example method 400 in accordance with some example embodiments of the present disclosure. For the purpose of discussion, the method 400 will be described from the perspective of the first device. Only for the purpose of illustrations, the method 400 is described with the reference to the first device 110-1.

At block 410, the first device 110-1 may receive the DCI for the multicast traffic from the second device 120. For example, a format of the DCI may be DCI format 1_0 or DCI format 1_1.

At block 420, the first device 110-1 may determine whether the DCI format is other than DCI format 1_0. If the DCI format is the DCI format 1_0, the DCI has only limited variable size fields and the method 400 can stop.

If the DCI format is not the DCI format 1_0, the first device 110-1 may determine, at block 430, whether the CFR is configured. The CFR can affect the FDRA field size determination. If the CFR is configured, at block 440, the first device 110-1 may determine the FDRA field size based on the CFR size.

If the CFR is not configured, at block 450, the first device 110-1 may determine the FDRA field size based on the BWP size. At block 460, the first device may determine whether the set of parameters are configured. In other words, the first device may determine whether the higher layer parameters for variable size DCI fields are configured—for example, either using pdcch/pdsch-config-mbs.

If the set of parameters are configured, at block 470, the first device 110-1 may determine one or more field sizes based on the set of parameters. The first device 110-1 can perform blind coding on the appropriate search spaces or control channel elements based on the one or more field sizes. The first device 110-1 may apply the determined one or more field sizes for blind decoding on the search space/ control channel element related to the multicast traffic. If the set of parameters are not configured, at block 480, the first device 110-1 may determine the one or more field sizes based currently used RRC parameter (for example, the first RRC configuration mentioned in FIG. 2). The term "control-channel element (CCE)" used herein can refer to a resource-element group(s) (REGs) where a resource-element group equals one resource block during one OFDM symbol. The term "search space" used herein can refer to an area in a downlink resource grid where PDCCH may be carried. Search Space can be indicated by a set of contiguous control channel elements (CCEs) the UE is supposed to monitor for scheduling assignments/grants relating to a certain component carrier. For example, there are two types of search spaces used in NR-PDCCH to control each component carrier, for example, Common Search Space (CSS) and UE-Specific Search Space (USS). For CSS, DCI cyclic redundancy check (CRC) may be scrambled with a System Information RNTI (SI-RNTI), Random Access RNTI (RA RNTI), Temp Cell RNTI (TC-RNTI), Paging RNTI (P-RNTI), Interruption RNTI (INT-RNTI), Slot Format Indication RNTI (SFI-RNTI), transmission power control (TPC)-PUCCH-RNTI, TPC-PUSCH-RNTI, TPC-SRS-RNTI, Cell RNTI (C-RNTI), Configured Scheduling RNTI (CS-RNTI). For USS, DCI CRC may be scrambled with a C-RNTI, CS-RNTI, these are specifically targeted to individual UE. A CSS is shared across all UEs and a USS is used per UE basis (meaning this SS is specific for a UE).

FIG. 5 shows a flowchart of an example method 500 in accordance with some example embodiments of the present disclosure. For the purpose of discussion, the method 500 will be described from the perspective of the first device. Only for the purpose of illustrations, the method 500 is described with the reference to the first device 110-1.

At block 510, the first device 110-1 may receive the DCI for the multicast traffic from the second device 120. For example, a format of the DCI may be DCI format 1_0 or DCI format 1_1.

At block 520, the first device 110-1 may determine whether the DCI format is other than DCI format 1_0. If the DCI format is the DCI format 1_0, the DCI has only limited variable size fields and the method 500 can stop.

If the DCI format is not the DCI format 1_0, the first device 110-1 may determine, at block 530, whether the CFR is configured. The CFR can affect the FDRA field size determination. If the CFR is configured, at block 540, the first device 110-1 may determine the FDRA field size based on the CFR size.

If the CFR is not configured, at block 550, the first device 110-1 may determine the FDRA field size based on the BWP size. At block 560, the first device may determine whether the set of parameters are configured. In other words, the first device may determine whether the higher layer parameters for variable size DCI fields are configured—for example, either using pdcch/pdsch-config-mbs.

If the set of parameters are configured, at block 570, the first device 110-1 may determine one or more field sizes based on the set of parameters. The first device 110-1 can perform blind coding on the appropriate search spaces based on the one or more field sizes.

If the set of parameters are not configured, at block 580, the first device 110-1 may determine whether default values of parameters for the field size estimation are defined. In other words, the first device 110-1 may determine whether default values of the set of parameters are configured at the first device 110-1. If the default values are not defined, at block 585, the first device 110-1 may determine the one or more field sizes based on currently used RRC parameter (for example, the first RRC configuration mentioned in FIG. 2).

If the default values are defined, at block 590, the first device 110-1 may determine the one or more field sizes based on default values. In some embodiments, the default values may be predetermined. The second RRC configuration only needs to be sent if the field sizes differ from the default values. The configuration signaling of pdcch/pdsch-config-mbs may comprise an indicator—which could be the name of the variable sized DCI field, which indicates the different set of field sizes that needs to be applied for DCI size estimation. In this way, it enables reduced signalling from the network since these values need to be sent to the first device 110-1 only if they are different from the default value.

Figure 6:
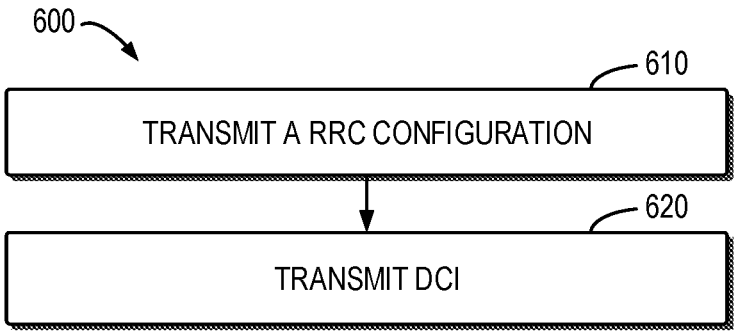
FIG. 6 illustrates a flowchart of a method implemented at a second apparatus according to some other example embodiments of the present disclosure.

FIG. 6 shows a flowchart of an example method 600 in accordance with some example embodiments of the present disclosure. For the purpose of discussion, the method 600 will be described from the perspective of the second device. Only for the purpose of illustrations, the second device can be the second device 120.

At block 610, the second device 120 transmits a RRC configuration for a multicast traffic to the first device 110-1. The multicast traffic can be any suitable type of multicast traffic—which is received by a group of users or broadcast traffic which could be received by all users connected to the network.

The RRC configuration can comprise a set of parameters associated with a field size estimation for the multicast traffic. For example, the set of parameters may comprise a carrier indicator field parameter which indicates a size of a carrier indicator field in DCI for the multicast traffic. In other words, the carrier indicator field parameter can inform the first device 110-1 regarding the field size of the carrier indicator to be assumed for the DCI.

Alternatively or in addition, the set of parameters can comprise a bandwidth part indicator field parameter which indicates a size of a bandwidth part indicator field in the downlink control information. This parameter can enable the first device 110-1 to determine the field size to be assumed for the bandwidth part indicator field.

In some example embodiments, the set of parameters can comprise a feedback timing indicator parameter which indicates a size of a feedback timing indicator field in the downlink control information. For example, the feedback timing indicator may be PDSCH-to-HARQ_feedback timing indicator. When HARQ ACK/NACK or NACK only is enabled, the size of the feedback timing indicator field is the same for terminal devices receiving the multicast traffic as indicated by the feedback timing indicator field parameter. However, terminal devices may need to interpret the feedback timing indicator differently, i.e. the same value of the feedback timing indicator may correspond to different timings. For example, if HARQ ACK/NACK is enabled, the first device 110-1 may need to interpret a signaled value in the PDSCH-to-HARQ_feedback timing indicator field differently from another first device (for example, the device 110-2). In this case, the first device 110-1 needs to receive a configuration instructing the device how to interpret values of PDSCH-to-HARQ_feedback timing indicator in e.g., the first RRC configuration 2010. The first device 110-1 may combine the configuration received using the first RRC configuration with the common configuration received using the second RRC configuration to derive unique HARQ ACK/NACK feedback resources.

In some embodiments, the second device 120 may configure an offset to be applied by the first device 110-1 for G-RNTI scrambled DCI. Alternatively, the second device 120 may configure a table of PUCCH configurations in needed order.

In other example embodiments, the set of parameters may comprise a priority indicator field parameter which indicates a size of a priority indicator field in the downlink control information.

In addition, the set of parameters can comprise a parameter for an optional configuration. The parameter may indicate a size of the optional configuration in the downlink control information. The optional configuration may comprise a virtual resource block (VRB) to physical resource block (PRB) mapping. The optional configuration may also comprise a PRB bundling size indicator. In other embodiments, the optional configuration may comprise a rate matching indicator. Alternatively or in addition, the optional configuration may comprise a zero power channel state information reference signal (ZP CSI-RS) trigger. The optional configuration can also comprise a downlink assignment index. In some example embodiments, the optional configuration may comprise an antenna port and number of layers. In other example embodiments, the optional configuration may comprise a physical downlink shared channel (PDSCH) group index. The optional configuration may comprise a new feedback indicator. Additionally, the optional configuration may comprise a number of requested PDSCH groups. As an example embodiment, the optional configuration may comprise a sounding reference signal request. Code block group (CBG) transmission information may be included in the optional configuration. The optional configuration can also comprise CBG flushing out information (CBGFI). Alternatively or in addition, the optional configuration may comprise a minimum applicable scheduling offset indicator. In some example embodiments, the optional configuration may comprise a secondary cell dormancy indication. The optional configuration can comprise other configuration which is not explicitly required for the multicast traffic.

The set of parameters can comprise any one or any combinations of the above mentioned parameters. The set of parameters may also comprise other parameter(s) which also relates to estimating the field size in the DCI.

In some embodiments, the set of parameters can be signaled as part of PDCCH configuration, for example, pdcch-config-mbs which is based on pdcch-config that provides UE's control resource set parameters and additional parameters required for acquiring the PDCCH, as defined in TS 38.331, and provides the common set of DCI field size parameters that needs to be applied for a DCI with CRC scrambled using G-RNTI. Alternatively, the set of parameters may be signaled as part of PDSCH configuration, for example, pdsch-config-mbs which is based on pdsch-config that contains higher layer parameters that UE utilizes to estimate some of the variable size DCI fields as defined in TS 38.331. The PDCCH configuration/PDSCH configuration may be transmitted as a part of the second RRC configuration. The second RRC configuration may be a group-common RRC message. For example, the second RRC configuration may be signaled using a group-common RNTI. The second RRC configuration may also be a UE-specific RRC message, and the first device 110-1 may apply the second RRC configuration for determining the DCI size only for DCI that is scrambled using a group-common RNTI. In an example embodiment, the second RRC configuration may be transmitted together with the first RRC configuration in a single UE-Specific RRC message.

Alternatively, default values of some or all parameters of the set of parameters may be predetermined or configured at the first device 110-1. The first device 110-1 can apply these default values for estimating the DCI size for blind decoding, if multicast scheduling parameters such as G-RNTI, related search spaces and DCI formats are configured, and if the second device 120 does not transmit some or all parameters of the set of parameters to the first devices. The default values may be specified in standard specification, hard-coded in the first devices, or configured by the second device via certain configuration message, e.g., the first RRC configuration.

Alternatively, the second RRC configuration for the multicast traffic may comprise a subset of the set of parameters. The rest parameters in the set of parameters may have default values at the first device 110-1. In other words, the rest parameters can be predefined and the second RRC configuration does not need to carry the rest parameters which have default values. In this case, the first device 110-1 may determine the one or more field sizes based on the subset of the parameters and the default values of the rest parameters. In this way, signaling the may be reduced. Only as an example, the second RRC configuration for the multicast traffic may indicate: a carrier indicator field has 3 bits, a bandwidth part indicator field has 1 bit, the VRB-to-PRB mapping field has 1 bit, the PRB bundling size indicator field has 0 bit. The rest parameters are default values, for example, a rate matching indicator field is set to 0 bit, a ZP CSI-RS Trigger field is set to 0 bit, the downlink assignment index is set to 0 bit, the PDSCH-to-HARQ_feedback timing indicator field is set to 0 bit, the antenna port(s) and number of layers field has 4 bits, the transmission configuration indication field is set to 0 bit, the CBGTI field is set to 0 bit, the CBGFI field is set to 0 bit. The default values of some or all parameters could be sent over an RRC configuration that is common for all the UEs receiving the multicast or broadcast service. This could be achieved by defining a specific radio network temporary identifier for signaling the default values from the second device to the first devices. The default values of some or all parameters could also be sent individually to each UE, e.g., via the first RRC configuration, with the indication that the parameters are to be applied only for receiving multicast or broadcast traffic, where the CRC of the DCI is scrambled using the G-RNTI.

At block 620, the second device 120 transmits DCI for a multicast to the first device 110-1. For example, a format of the DCI may be DCI format 1_0 or DCI format 1_1. If the format of the DCI is DCI format 1_0, the DCI has only limited variable size fields. In some embodiments, the first device 110-1 may determine the DCI format of said DCI. If the DCI format is not a preconfigured format (only as an example, DCI format 1_0), the first device 110-1 may determine whether a common frequency resource (CFR) is configured. In this case, if the CFR is not configured, the first device 110-1 may determine a frequency domain resource allocation (FDRA) field size based on an active bandwidth part size. Alternatively, if the CFR is configured, the first device 110-1 may determine a FDRA field size based on a CFR size.

In some example embodiments, an apparatus capable of performing the method 300 (for example, the first device 110) may comprise means for performing the respective operations of the method 300. The means may be implemented in any suitable form. For example, the means may be implemented in a circuitry or software module. The apparatus may be implemented as or included in the first device 110. In some example embodiments, the means may comprise at least one processor and at least one memory including computer program code. The at least one memory and computer program code are configured to, with the at least one processor, cause performance of the apparatus.

In some example embodiments, the apparatus comprises mean for receiving, at a first device and from a second device, downlink control information for a multicast traffic; means for determining, at the first device, one or more field sizes in the downlink control information based on a set of parameters associated with a field size estimation for the multicast traffic; and means for decoding the downlink control information based on the determined one or more field sizes.

In some example embodiments, the set of parameters comprises at least one of: a carrier indicator field parameter which indicates a size of a carrier indicator field in the downlink control information, a bandwidth part indicator parameter which indicates a size of a bandwidth part indicator field in the downlink control information, a feedback timing indicator parameter which indicates a size of a feedback timing indicator field in the downlink control information, a priority indicator field parameter which indicates a size of a priority indicator field in the downlink control information, or a parameter for an optional configuration which indicates a size of optional configuration field in the downlink control information.

In some example embodiments, the optional configuration comprises at least one of: a virtual resource block to physical resource block mapping, a physical resource block bundling size indicator, a rate matching indicator, a zero power channel state information reference signal, a downlink assignment index, an antenna port and number of layers, a physical downlink shared channel (PDSCH) group index, a new feedback indicator, a number of requested PDSCH groups, a sounding reference signal request, code block group transmission information, code block group flushing out information, a minimum applicable scheduling offset indicator, or a secondary cell dormancy indication.

In some example embodiments, the apparatus further comprises means for receiving, from the second device, a radio resource control configuration for the multicast traffic. In some example embodiments, the means for determining the one or more field sizes comprises: means for in accordance with a determination that the radio resource control configuration comprises the set of parameters, determining the one or more field sizes based on the set of parameters in the radio resource control configuration.

In some example embodiments, the apparatus further comprises means for in accordance with a determination that there is no radio resource control configuration for the multicast traffic, determining whether the set of parameters are predetermined and configured at the first device. In some example embodiments, the means for determining the one or more field sizes comprises: in accordance with a determination that the set of parameters are predetermined and configured at the first device, determining the one or more field sizes based on the set of predetermined and configured parameters.

In some example embodiments, the apparatus further comprises means for receiving, from the second device, a radio resource control configuration for the multicast traffic comprising a first subset of the parameters. In some example embodiments, the means for determining the one or more field sizes comprises: determining the one or more field sizes based on the first subset of the parameters and a second subset of the parameters which are default values at the first device.

In some example embodiments, the apparatus further comprises means for determining a format of the downlink control information; means for in accordance with a determination that the format is not a preconfigured format, determining whether a common frequency resource is configured; means for in accordance with a determination that the common frequency resource is not configured, determining a frequency domain resource allocation field size based on an active bandwidth part size; or means for in accordance with a determination that the common frequency resource is configured, determining a frequency domain resource allocation field size based on a common frequency resource size.

In some example embodiments, the apparatus further comprises means for applying the determined one or more field sizes for blind decoding on a search space related to the multicast traffic.

In some example embodiments, an apparatus capable of performing the method 600 (for example, the second device 120) may comprise means for performing the respective operations of the method 600. The means may be implemented in any suitable form. For example, the means may be implemented in a circuitry or software module. The apparatus may be implemented as or included in the second device 120. In some example embodiments, the means may comprise at least one processor and at least one memory including computer program code. The at least one memory and computer program code are configured to, with the at least one processor, cause performance of the apparatus.

In some example embodiments, the apparatus comprises means for transmitting, at a second device and to a first device, a radio resource control configuration for a multicast traffic, the radio resource control configuration comprising a set of parameters associated with a field size estimation for the multicast traffic; and means for transmitting, to the first device, downlink control information for the multicast traffic.

In some example embodiments, the set of parameters comprises at least one of: a carrier indicator field parameter which indicates a size of a carrier indicator field in the downlink control information, a bandwidth part indicator parameter which indicates a size of a bandwidth part indicator field in the downlink control information, a feedback timing indicator parameter which indicates a size of a feedback timing indicator field in the downlink control information, a priority indicator field parameter which indicates a size of a priority indicator field in the downlink control information, or a parameter for an optional configuration which indicates a size of the optional configuration field in the downlink control information.

In some example embodiments, the optional configuration comprises at least one of: a virtual resource block to physical resource block mapping, a physical resource block bundling size indicator, a rate matching indicator, a zero power channel state information reference signal, a downlink assignment index, an antenna port and number of layers, a physical downlink shared channel (PDSCH) group index, a new feedback indicator, a number of requested PDSCH groups, a sounding reference signal request, code block group transmission information, code block group flushing out information, a minimum applicable scheduling offset indicator, or a secondary cell dormancy indication.

Figure 7:
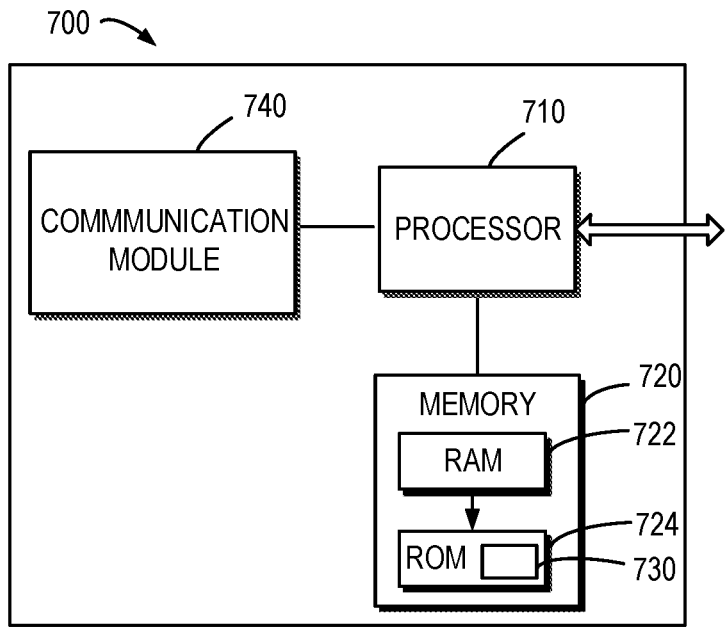
FIG. 7 illustrates a simplified block diagram of an apparatus that is suitable for implementing example embodiments of the present disclosure.

FIG. 7 is a simplified block diagram of a device 700 that is suitable for implementing example embodiments of the present disclosure. The device 700 may be provided to implement a communication device, for example, the first device 110 or the second device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not latest in the power-down duration.

A computer program 730 includes computer executable instructions that are executed by the associated processor 710. The program 730 may be stored in the memory, e.g., ROM 724. The processor 710 may perform any suitable actions and processing by loading the program 730 into the RAM 722.

Example embodiments of the present disclosure may be implemented by means of the program 730 so that the device 700 may perform any process of the disclosure as discussed with reference to FIGS. 2 to 6. The example embodiments of the present disclosure may also be implemented by hardware or by a combination of software and hardware.

Figure 8:
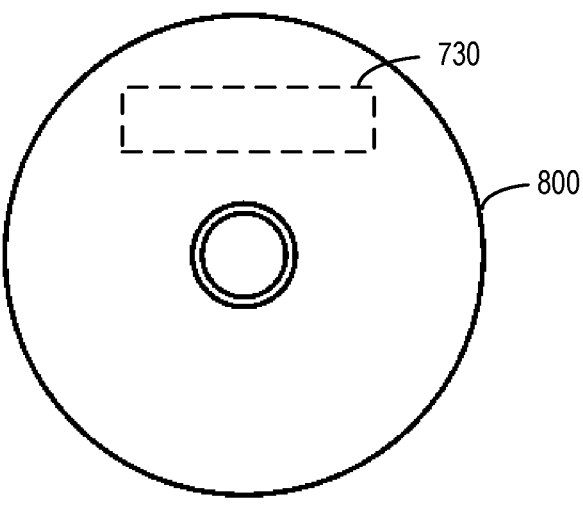
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and other magnetic storage and/or optical storage. FIG. 8 shows an example of the computer readable medium 800 in form of an optical storage disk. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 2 to 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one memory including computer program code;
wherein the at least one memory and the computer program code are configured to, with the at least one processor, cause the first device to:
    receive, from a second device, a radio resource control configuration for multicast traffic, wherein the radio resource control configuration comprises a set of parameters associated with a field size estimation of a downlink control information for multicast traffic;
    receive, from the second device, the downlink control information for multicast traffic;
    determine, at the first device, a format of the downlink control information;
    determine, at the first device, whether a common frequency resource is configured, based on a determining that the format of the downlink control information is not a preconfigured format;
    determine, at the first device, a frequency domain resource allocation field size based on an active bandwidth part size, in response to the determining that the common frequency resource is not configured;
    determine, at the first device, one or more field sizes of fields in the downlink control information based on the set of parameters; and
    decode the downlink control information based on the determined one or more field sizes, wherein the set of parameters comprises at least one of:
        a carrier indicator field parameter which indicates a size of a carrier indicator field in the downlink control information;
        a feedback timing indicator parameter which indicates a size of a feedback timing indicator field in the downlink control information;
        a priority indicator field parameter which indicates a size of a priority indicator field in the downlink control information; or
        a parameter for an optional configuration which indicates a field size of the optional configuration in the downlink control information.

2. The first device of claim 1, wherein the optional configuration comprises at least one of:
a virtual resource block to physical resource block mapping,
a physical resource block bundling size indicator,
a rate matching indicator,
a zero power channel state information reference signal,
a downlink assignment index,
an antenna port and number of layers,
a physical downlink shared channel, PDSCH, group index,
a new feedback indicator,
a number of requested PDSCH groups,
a sounding reference signal request, code block group transmission information,
code block group flushing out information,
a minimum applicable scheduling offset indicator, or
a secondary cell dormancy indication.

3. The first device of claim 1, wherein the at least one memory and the computer program codes are configured to, with the at least one processor, further cause the first device to:
    in accordance with a determination that there is no radio resource control configuration for the multicast traffic, determine whether the set of parameters are predetermined and configured at the first device; and
    wherein the at least one memory and the computer program codes are configured to, with the at least one processor, further cause the first device to determine the one or more field sizes by:
        in accordance with a determination that the set of parameters are predetermined and configured at the first device, determining the one or more field sizes based on the set of predetermined and configured parameters.

4. The first device of claim 1, wherein the at least one memory and the computer program codes are configured to, with the at least one processor, further cause the first device to:
    receive, from the second device, a radio resource control configuration for the multicast traffic comprising a first subset of the parameters; and
    wherein the at least one memory and the computer program codes are configured to, with the at least one processor, further cause the first device to determine the one or more field sizes by:
        determining the one or more field sizes based on the first subset of the parameters and a second subset of the parameters which are default values at the first device.

5. The first device of claim 1, wherein the at least one memory and the computer program codes are configured to, with the at least one processor, further cause the first device to:
    in accordance with a determination that the common frequency resource is configured, determine the frequency domain resource allocation field size based on a common frequency resource size.

6. The first device of claim 1, wherein the at least one memory and the computer program codes are configured to, with the at least one processor, further cause the first device to:
    apply the determined one or more field sizes for blind decoding on a search space related to the multicast traffic.

7. A method, comprising:
receiving, at a first device from a second device, a radio resource control configuration for multicast traffic, wherein the radio resource control configuration comprises a set of parameters associated with a field size estimation of a downlink control information for multicast traffic;
receiving, at the first device, the downlink control information for multicast traffic;
determining, at the first device, a format of the downlink control information;
determining, at the first device, whether a common frequency resource is configured, based on a determining that the format of the downlink control information is not a preconfigured format;

determining, at the first device, a frequency domain resource allocation field size based on an active bandwidth part size, in response to the determining that the common frequency resource is not configured;

determining, at the first device, one or more field sizes of fields in the downlink control information based on the set of parameters; and decoding the downlink control information based on the determined one or more field sizes, wherein the set of parameters comprises at least one of:

a carrier indicator field parameter which indicates a size of a carrier indicator field in the downlink control information;

a feedback timing indicator parameter which indicates a size of a feedback timing indicator field in the downlink control information;

a priority indicator field parameter which indicates a size of a priority indicator field in the downlink control information; or a parameter for an optional configuration which indicates a field size of the optional configuration in the downlink control information.

8. The method of claim 7, wherein the optional configuration comprises at least one of:

a virtual resource block to physical resource block mapping, a physical resource block bundling size indicator, a rate matching indicator, a zero power channel state information reference signal, a downlink assignment index, an antenna port and number of layers, a physical downlink shared channel, PDSCH, group index, a new feedback indicator, a number of requested PDSCH groups, a sounding reference signal request, code block group transmission information, code block group flushing out information, a minimum applicable scheduling offset indicator, or a secondary cell dormancy indication.

9. The method of claim 7, further comprising:

in accordance with a determination that there is no radio resource control configuration for the multicast traffic, determining whether the set of parameters are predetermined and configured at the first device; and wherein determining the one or more field sizes comprises:

in accordance with a determination that the set of parameters are predetermined and configured at the first device, determining the one or more field sizes based on the set of predetermined and configured parameters.

10. The method of claim 7, further comprising:

receiving, from the second device, a radio resource control configuration for the multicast traffic comprising a first subset of the parameters; and wherein determining the one or more field sizes comprises:

determining the one or more field sizes based on the first subset of the parameters and a second subset of the parameters which are default values at the first device.

11. The method of claim 7, further comprising:

in accordance with a determination that the common frequency resource is configured, determining the frequency domain resource allocation field size based on a common frequency resource size.

12. The method of claim 7, further comprising:

applying the determined one or more field sizes for blind decoding on a search space related to the multicast traffic.

* * * * *